United States Patent
Thielen

(10) Patent No.: US 12,475,484 B2
(45) Date of Patent: Nov. 18, 2025

(54) SYSTEMS AND METHODS FOR USING AN IDENTIFIER TO CAPTURE INFORMATION ABOUT A USER EXPERIENCE ASSOCIATED WITH A MEDIA ACCESS DEVICE

(71) Applicant: Universal Electronics Inc., Scottsdale, AZ (US)

(72) Inventor: Kurt Roman Thielen, Maple Grove, MN (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

(21) Appl. No.: 18/313,456

(22) Filed: May 8, 2023

(65) Prior Publication Data
US 2024/0378641 A1    Nov. 14, 2024

(51) Int. Cl.
*G06Q 30/02* (2023.01)
*G06Q 30/0251* (2023.01)
*H04W 4/029* (2018.01)

(52) U.S. Cl.
CPC ........ *G06Q 30/0267* (2013.01); *H04W 4/029* (2018.02)

(58) Field of Classification Search
CPC .......................... G06Q 30/0267; H04W 4/029
See application file for complete search history.

(56) References Cited

U.S. PATENT DOCUMENTS

| | | | |
|---|---|---|---|
| 7,152,237 B2 | 12/2006 | Flickinger et al. | |
| 8,849,199 B2 | 9/2014 | Shrum, Jr. et al. | |
| 9,137,570 B2 | 9/2015 | Hatambeiki et al. | |
| 2002/0010390 A1 | 1/2002 | Guice et al. | |
| 2004/0070491 A1* | 4/2004 | Huang | H04L 12/282 340/10.5 |
| 2009/0298514 A1 | 12/2009 | Ullah | |
| 2011/0258049 A1 | 10/2011 | Ramer | |
| 2017/0213200 A1* | 7/2017 | Purves | G06Q 20/204 |
| 2020/0084497 A1 | 3/2020 | Liu | |
| 2020/0196018 A1* | 6/2020 | Burbank | H04N 21/44008 |
| 2021/0012028 A1 | 1/2021 | Cabot et al. | |
| 2021/0120298 A1* | 4/2021 | Arling | H04N 21/4222 |
| 2021/0368562 A1* | 11/2021 | Hatambeiki | H04W 8/005 |

OTHER PUBLICATIONS

University of Chicago, "Too Many Metrics" (Year: 2016).*
International Search Report and Written Opinion of application No. PCT/US24/24971, dated Aug. 28, 2024, 7 pp.

* cited by examiner

*Primary Examiner* — Breffni Baggot
(74) *Attorney, Agent, or Firm* — Greenberg Traurig, LLP

(57) ABSTRACT

A system includes a mobile device and a receiving device associated with a media access device. The receiving device obtains from the mobile device during a process in which the mobile device and the receiving device are paired a first identifier that uniquely identifies the mobile device. The first identifier is then associated within the receiving device to a universal advertising identifier. Thereafter, when the mobile device is determined to be in proximity to the receiving device, at least the universal advertising identifier is caused to be provided to a remote server. In this manner, the remote server can track at least a presence of a user with the media access device.

16 Claims, 3 Drawing Sheets

SYSTEMS AND METHODS FOR USING AN IDENTIFIER TO CAPTURE INFORMATION ABOUT A USER EXPERIENCE ASSOCIATED WITH A MEDIA ACCESS DEVICE

BACKGROUND

Companies that manufacture and/or sell media access devices, such as smart TVs, media streamers, etc., make very little profit selling their hardware products. Their margins are very tight, and in many cases, they sell the hardware at a loss. Most companies today rely on the monetization of data and advertising as their primary source of profit, or they are quickly moving in that direction as a means to survive. Accordingly, while systems that function to generally determine users within an environment that includes a media access device exist (see, e.g., US 2021/012028 and US 2002/0103909 which publications are incorporated herein by reference in their entirety), a need remains for an improved system and method for capturing information associated with users where such information can be utilized to help companies gain market share and drive profit growth from their data and advertising businesses.

SUMMARY

The following relates generally to improved systems and methods for using an identifier to capture information about a user experience associated with a media access device, such as a smart TV. As will become apparent from the description that follows, the systems and methods particularly seek to identify the one or more users that are in front of the media access device and/or actually watching media being provided via use of the media access device at any given time. Among other advantages, having this data will enable advertisers to target addressable advertisements more effectively, target specific audiences (individuals), significantly enhance their per ad revenue, etc.

In one example, a system includes a mobile device and a receiving device associated with a media access device. The receiving device obtains from the mobile device during a process in which the mobile device and the receiving device are paired a first identifier that uniquely identifies the mobile device. The first identifier is then associated within the receiving device to a universal advertising identifier. Thereafter, when the mobile device is determined to be in proximity to the receiving device, at least the universal advertising identifier is caused to be provided to a remote server. In this manner, the remote server can track at least a presence of a user with the media access device.

In one example, the receiving device has a limited range of communication with the media access device. In this manner, when the mobile device is determined to be in proximity to the receiving device, that the media access device can receive an indication from the receiving device that the mobile device is proximity to the receiving device indicates that the mobile device is also in proximity to the media access device. Further, since the mobile device is a device carried by a user, that the media access device can receive an indication from the receiving device that the mobile device is proximity to the receiving device indicates that the user is present with the media access device.

In one example, the mobile device comprises a mobile phone.

In one example, the mobile device comprises a user wearable device.

In one example, the user wearable device comprises a smart watch.

In one example, the user wearable device comprises a fitness tracking device.

In one example, the receiving device comprises a remote control configured to transmit communications to the media access device.

In one example, the receiving device is a component part of the media access device.

In one example, the media access device comprises a smart television.

In one example, the media access device comprises a media streaming device.

In one example, the receiving device uses a user entered phone number when causing the first identifier to be associated within the receiving device to the universal advertising identifier.

In one example, the receiving device uses a user entered email address when causing the first identifier to be associated within the receiving device to the universal advertising identifier.

In one example, the receiving device receives a notification from the mobile device when the mobile device determines that the mobile is in proximity to the receiving device.

In one example, the receiving device determines that the mobile device is in proximity to the receiving device whenever the receiving device and the mobile device are subsequently paired.

In one example, the receiving device uses a strength of a signal received from the mobile device to determine that the mobile device is in proximity to the receiving device.

In one example, the receiving device instructs the media access device to provide state information of the media access device to the remote server with the universal advertising identifier.

In one example, the receiving device causes at least the universal advertising identifier to be provided to the remote server with a notification that that the mobile device is determined to no longer be in proximity to the receiving device whereby the remote server can track when at least a presence of the user with the media access device has ended.

A better understanding of the objects, advantages, features, properties and relationships of the various aspects described hereinafter will be obtained from the following detailed description and accompanying drawings which set forth illustrative embodiments and which are indicative of the various ways in which the principles of the invention claimed hereinafter may be employed.

DETAILED DESCRIPTION

Figure 1:
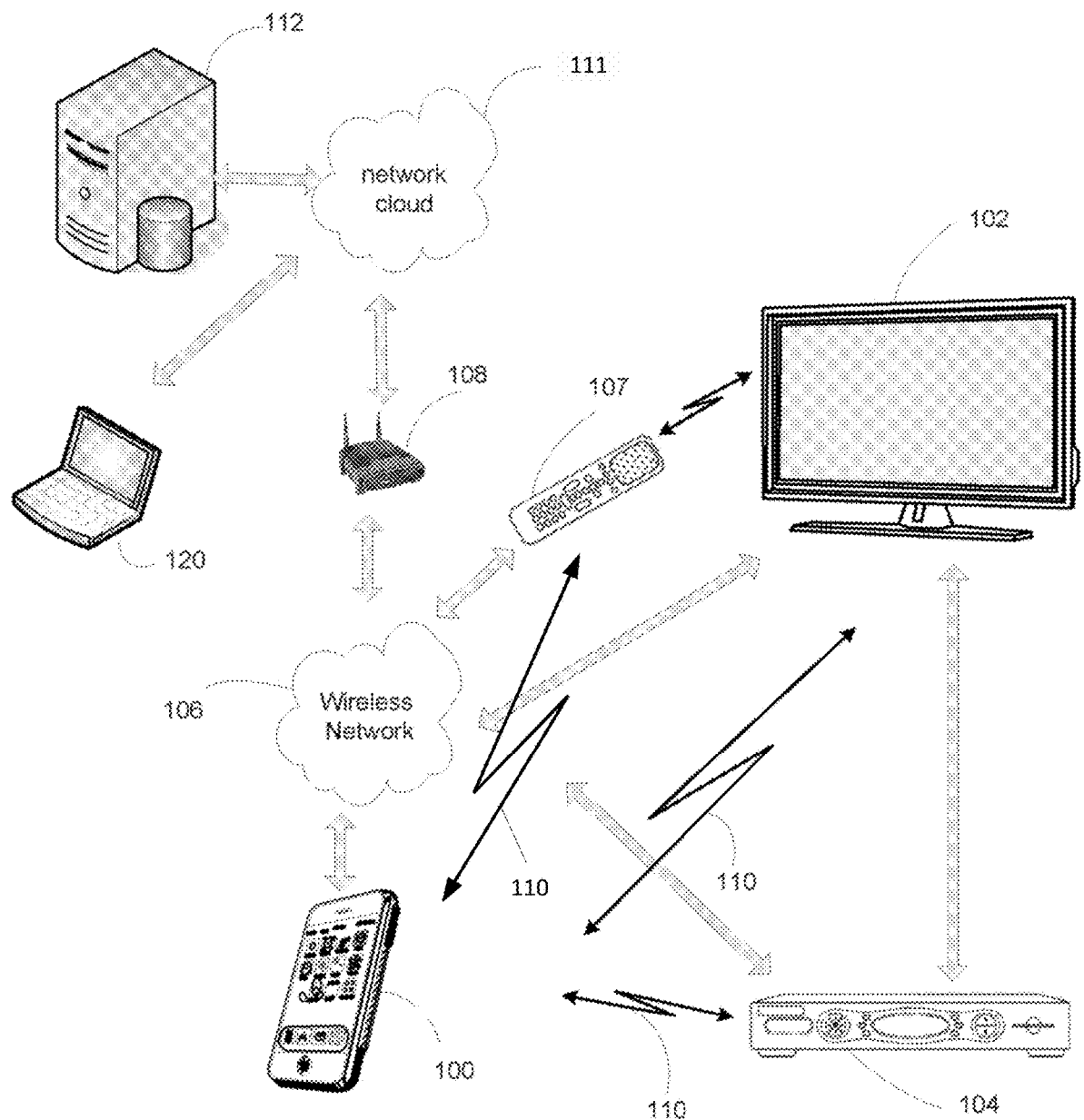
FIG. 1 illustrates an example system for using an identifier to capture information about a user experience associated with a media access device.

The following description of example methods, systems, and apparatus is not intended to limit the scope of the description to the precise form or forms detailed herein.

Instead the following description is intended to be illustrative so that others may follow its teachings.

The following describes systems and methods for automatically obtaining the identity of one or more users proximate to and/or interacting with, e.g., watching content provided by, a media access device, such as a smart TV, at any given time in real time. To this end, the systems will facilitate a user pairing their mobile phone (or another device that is carried by the user, such as a fitness tracker, smart watch, etc.) to a remote control device (or other device, including a media access device itself, that is known to generally remain in the vicinity of the media access device.) For ease of description, any device usable in accordance with the disclosure that follows that would be moved with a user is referred to as a mobile phone and any device usable in accordance with the disclosure that follows that would generally remain in the vicinity of a media access device is referred to as a remote control.

The systems will also function to link an identifier for the user to a device identifier for the mobile phone, such as a device identifier that is provided when the mobile phone is paired with the remote control. Thereafter, every time the user is in proximity to the remote control, for example when the phone is paired with the remote control, the remote control can share the user's identity with at least the media access device and the media access device can, as needed, share the user's identity and, as appropriate and as needed, information concerning interactions with the remote control and/or media access device by the user, with other devices and systems coupled to the media access device, such as a head-end device associated with a media service provider. Proximity of the mobile device to the remote control can also or alternatively be determined at the mobile phone via use of signal fingerprinting, absolute coordinates (such as obtained from GPS or the like devices), triangulation, signal strength analysis, and the like without limitation and the mobile device can inform the remote control of its proximity to the remote control when systems resident on the mobile device, as opposed to resident on the remote control, are used to make the proximity determination.

Once a user has associated their mobile phone with the remote control to thereby enable the systems and methods described hereinafter, certain advantages will be obtained. From the perspective of the user, once the user has associated their mobile phone with the remote control such that a system will be enabled to know exactly when that user is (or is not) interacting with/in front of a media access device, the systems may utilize such information to beneficially provide or filter content/advertising, provide interface adjustments for the hardware device or apps running thereon, provide content, services, hardware recommendations to the user, etc.

By way of further example, user information captured by a system in the manner described hereinafter can be provided to one or more entities associated with a media access device. Such entities may include content providers, e.g., HULU, NETFLIX, etc., the provider, manufacturer, or seller of the streaming device, e.g., AMAZON, ROKU, APPLE, etc., or the like. These entities can use the user related information to beneficially enhance the experience of the tracked user, e.g., to modify the user interface associated with their service/the device to make interactions with the service/device easier for the user, may filter, sort, highlight, recommend, or otherwise organize the content for the user to enhance the media viewing experience of the user, or the like. As will be appreciated, such alterations or modification may be performed as a function of, for example, previously captured interactions by the user or users with the media access device and/or media related services associated with the media access device as determined via use of the tracked identifier.

The hereinafter described systems and methods can also be advantageously used to automate device and/or service onboarding. As will be appreciated, one of the most annoying tasks when unboxing and setting up a new media access device, such as a smart TV, is configuring each streaming content service. To solve this problem, it is contemplated that, once the user pairs their mobile device with the remote control and has performed an initial setup which would occur the first time a content service is setup with/linked to the identifier (for example on the user's phone), the remote control and the media access device will work together to use the identifier to activate, using the user credentials associated with the identifier, all of the content services on the media access device and any future media access devices.

In a similar fashion, it is contemplated that the hereinafter described systems and methods may be utilized to solve the problems associated with the task of setting up a new media access device with a home Wi-Fi network. As above, once the mobile phone is paired with the remote control, the Wi-Fi configuration information can be entered and stored in a secure store. The configuration information can then be recalled during all future device/network setups, or when the Wi-Fi password is changed, drastically simplifying the setup process. One of the big advantages of this method is that, if the Wi-Fi password on the home router is changed, this process can be used to update all of the devices in communication with the remote control in the house automatically, all at once, without having to do it on a device-by-device basis, regardless of the brand of device. In addition or alternatively, 2-factor authentication could be utilized with the WiFi password stored locally on a first device on the home network and not in the cloud. In this instance, when a second device on the home network obtains the password from the first device, an authentication passcode can be presented to the user (e.g. 4 digits)—by the first device, by use of the mobile device, etc.—for entry into, in the example, the second device or an application in communication with the second device or the like, to confirm that the second device is being provisioned by the user. In this example, the second device may pull the configuration (password, etc.) from first device using a subnet of the network in the household.

As concerns the accessing of content, the identifier that is to be used in the subject systems and method can be used to block specific addressable ads from being displayed to the user. In one example, it is contemplated that, when an addressable ad is presented to a user, the user can press an AdBlock button provided to the remote control which will cause the remote control to transmit a message to the media access device for the purpose of disabling the ad for a particular length of time, e.g., 1 day, 1 week, 1 month or 1 year, for that particular user, e.g., to be blocked when it is determined that the user, based on the identifier, is proximate to the media access device. This advertisement opt-out information is shared with the media access device's addressable ad backend and the ad targeting service may simply select the next best ad to play based on the household or view demographic. As will be further appreciated, there is value to both the consumer and the advertiser for this feature, as the consumer can eliminate ads they do not want to see, and the advertiser does not have to waste money continuing to send ads that are not wanted by that user. For advertisers, knowledge obtained and/or inferred via use or non-use of the Adblock feature can drive more ad revenue and more data revenue, e.g., this data can be sold to third party data aggregators, identity players, etc. It will also be appreciated that a key could also be provided on the remote control whereby a user can indicate that the user likes the advertisement and the this information could be used by advertisers to provide more of the same or similar advertisements to the user.

Once a user has associated their mobile phone with the remote control to thereby enable the systems and methods described hereinafter, it will be appreciated that the identifier can be unitized to provide enhanced T-Commerce, i.e., e-commerce provided through media access devices such as smart TVs. In this regard, the identifier that is caused to be associated with the remote control can itself be associated with payment information for the user that would allow a light-touch method of purchasing of product or services (content, etc.) on the media access device.

Turning now to FIG. 1, an example of a system for using an identifier to capture information about a user experience with a media access device, such as smart TV 102 or STB/media streamer 104, etc., is illustrated. While illustrated in the context of a smart TV 102 and a set top box 104, it will be appreciated by one of ordinary skill in the art that smart TV 102 and the STB 104 may be separate (as illustrated) or combined into a single unit. Moreover, throughout the following disclosure, while the example methods and systems are directed towards configuring an identifier for use with the smart TV 102 and/or the STB 104, it will be understood that the examples and use of the identifier detailed herein may be equally applicable to any suitable device including, for instance, a smart phone, tablet, laptop, computer, ereader, gaming system, etc.

In this example, each of the smart TV 102 and the STB 104 may communicate with a wired and/or wireless network 106, which would include one or more routing device. The network 106, in turn, communicates with a network gateway device 108, and a network cloud 111, coupled to a network database 112, accessible via the network cloud 111, in which may be stored user profile data and other data as desired. The system may also be linked to third party payment processing systems, advertising and content delivery systems, data aggregator systems, and the like without limitation and the user profile data may, in turn, be linked to data stored on such third party systems as needed. A computer terminal 120 may be coupled to the network cloud 110 to communicate with the various network components. As noted, it is to be understood that controllable appliances may include, but need not be limited to, televisions, cable or satellite converter set-top boxes, cable ready devices, personal computers, etc.

A second smart device, such as a smart phone 100 may be coupled to the wireless network 106 and may be further adapted to exchange communication with remote control device 107. The remote control 107 is preferably a universal remote control that is adaptable to communicate with, i.e., issue commands to and provided data to, the STB 104, the smart TV 102, and other devices within the environment. The communications may be sent directly between the devices and/or may be performed using the network 106. The remote control 107 may also be adaptable to also receive communications from the devices, again either directly from the devices and/or via use of the network 106. The phone 100 exchanges data via paring communications 110 with the remote control 107 and/or with the media access devices 102/104 for the purposes described herein.

The smart phone 100 and the remote control 107 (and/or the media access device 102/104) may communicate directly with each other or via the network 106, using any suitable communication protocol including NFC, Wireless Communication, Bluetooth, etc. Appliance commands may be issued from the remote control 107 in the form of infrared signals, or in any other suitable format, e.g., via an RF signal such as contemplated by RF4CE, Zwave, Bluetooth, etc.; ultrasonic signal; visible light; etc. as appropriate for the control of each particular appliance. As noted, the remote control 107 can be programmed to use the communication protocol recognizable by multiple different types of devices of different brands.

Figure 2:
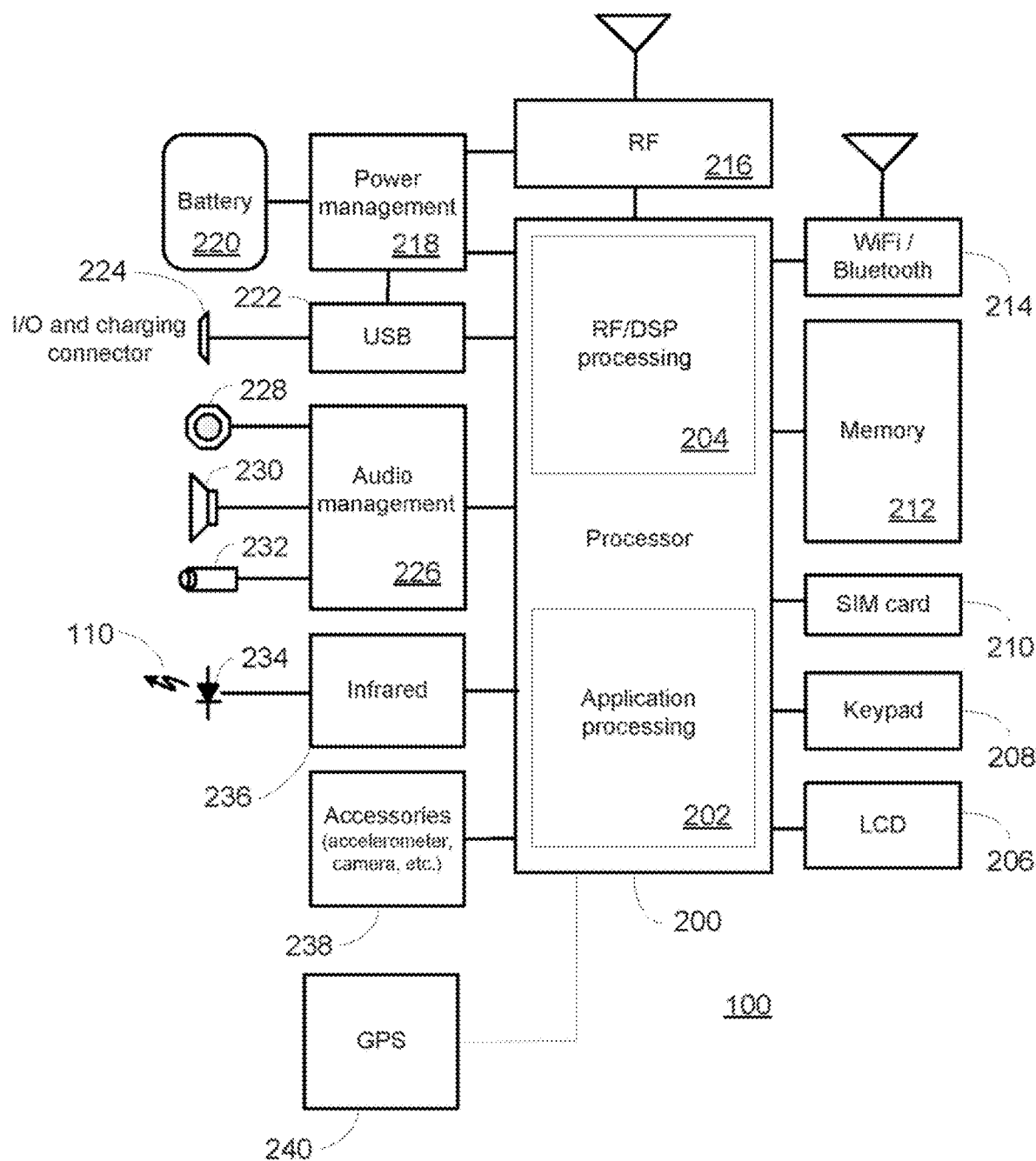
FIG. 2 illustrates in block diagram form example components of the example smart device and/or remote control of FIG. 1.

With reference to FIG. 2, the smart phone 100 may include, as needed, for a particular application, processing means 200 which may comprise an application processing section 202 and an signal processing section 204; a display 206; a keypad 208 which may comprise physical keys, touch keys overlaying the display 206, or a combination thereof; a subscriber identification module (SIM) card 210; memory means 212 which may comprise ROM, RAM, Flash, or any combination thereof; WiFi and/or Bluetooth wireless interface(s) 214; a wireless telephony interface 216; power management circuitry 218 with associated battery 220; a USB interface 222 and connector 224; an audio management system 226 with associated microphone 228, speaker 230, and headphone jack 232; optional IR communication means comprising a transmitter and/or receiver 236 with associated IR output diode(s) 234, various optional accessory features 238 such as a digital camera, accelerometer, etc., and a GPS 240.

It will be appreciated that the remote control 107 includes some or all of the components noted above as needed for any particular purpose. For additional information on the components of a remote control 107 and the applications needed to configure a remote control to communicate with other devices within the home environment, e.g., to provide remote control 107 with universal remote control functionality, reference may be had to U.S. Pat. Nos. 11,568,738, 11,259,067, and 8,254,352.

Figure 3:
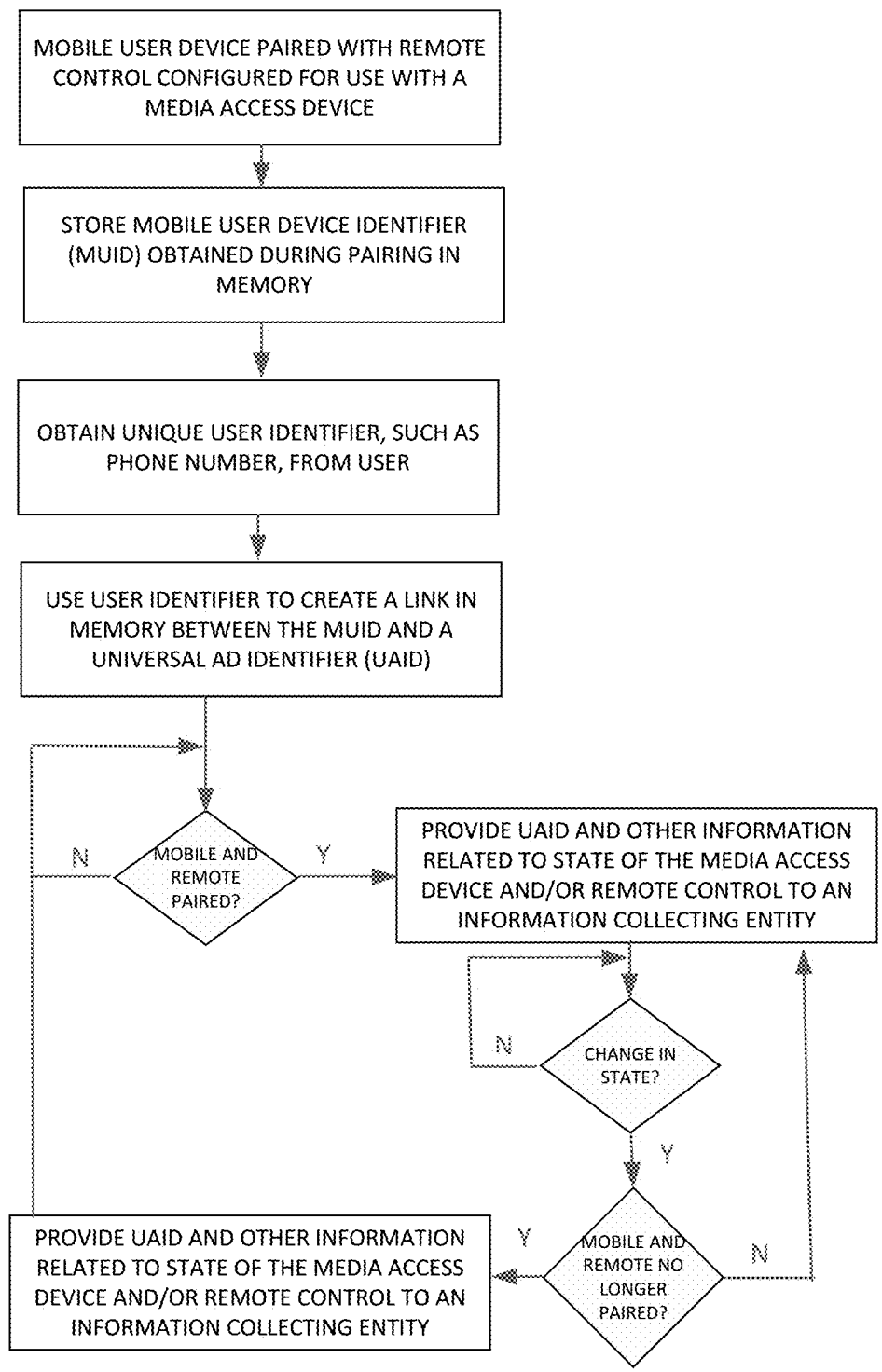
FIG. 3 illustrates in flow chart form an example method for capturing information about a user experience associated with a media access device.

Turning now to FIG. 3, operation of the system for the purposes described herein rely upon getting a user's identity or an equally suitable identifier for the user that can be used to track user interactions with the system, e.g., to allow advertisers to uniquely identify an individual for advertising purposes. In a preferred example, the identifier will be a phone number of the cell phone 100 that is operated by the user and the phone number will be used as a core element of identity to authenticate the user. While the phone number is preferred because it can be easily entered using a numeric keypad of the remote control 107, the identifier could be an email address or even a device ID for the phone 100. Using the phone number or email address will, however, let users of the system more easily cross-reference information obtained by the system with information obtained by other systems with which the user may interact.

The identity information may be acquired by the system through a process of pairing the mobile phone 100 of the user to the remote control 107. Once the phone 100 is paired with the remote control 107 and the phone number is received at the remote control 107, the remote control 107 (for example via an IP connection to the smart TV 102) may cause the user provided identifier to be associated with one or more Universal Advertising IDs (e.g., TradeDesk, LiveRamp, PubCID, etc). These Universal Advertising IDs (UAIDs) are used in digital advertising to uniquely identify an individual. By way of example, TradeDesk provides functionality to convert email and/or phone number data into hashed, salted identifiers to serve as a signal to cookies. Once the process is completed and the acquired UAID is linked to the device identifier for the mobile phone, the UAID can be shared (licensed) to interested parties including the seller/manufacturer of devices, content streamers, advertisers, etc.

As described above, sharing the UAID with the manufacturers, sellers, and/or operators of media access devices and/or the providers of content allows such entities to enable their value-add services including content recommendation, auto setup, AdBlock, addressable ad targeting, etc. In this regard, it will be appreciated that the UAID will be shared with such systems when the mobile phone 100 of the user is discerned to be within proximity to the remote control 107, e.g., when the two devices are in paired communication. In this manner, interactions with the devices and/or content with the user determined to be presented may be tracked by the devices, and linked to the UAID and the information associated with such usage, e.g., the UAID, time, date, content being watched, buttons on remote activated, etc. may be provided by the device to the head-end servers, data aggregating servers, etc. as desired. Information can be provided in response to any change in state of the system, e.g., new content is tuned to, the user leaves the proximity of the media access device, the user interacts with the remote control, etc. The information can be provided in in real-time when the state change is determined and/or the information can be collected and provided on a periodic bases as desired.

It will also be appreciated that interactions with a media access device by others when a user is not present, e.g., when the mobile phone 100 of the user is not paired with the remote control 110, could also provide be captured and this information could also be provided to entities to thereby inform such entities when the user is not using the media access device.

The initial method used to setup and pair with the remote control 107 in accordance with this disclosure will be very simple and all subsequent processes to pair the mobile phone 100 with the remote control 107 will be automated. This will ensure the efficacy of the system and ensure it is always working and providing maximum value to all parties. To this end and in an example, the pairing process may be initiated by a media access device during the initial setup (onboarding) process of the media access device and subsequently as necessary to gather the identity of each new member of the household, e.g., each time the remote control 107 used with the media access device detects a new phone in close proximity it can cause an alert to be presented that recommends a pairing. The alert for the user to pair their mobile phone with the remote control 107 can be presented on the remote control itself or the remote control can instruct the media access device to display an alert to the user via a display coupled to the media access device as desired. The pairing between the devices can be performed using Bluetooth, NFC, FIDO, UWB, THREAD, etc.

Once the two devices are paired, if the phone number cannot be automatically obtained from the phone as a part of the paring process, the system can prompt the user to enter their mobile phone number into the remote control 107, for example using the 9-digit keypad conventionally provided on a remote control. Once entry of the phone number is detected by the remote control or otherwise indicated by the user, the system can cause a text message to be sent to the mobile phone and the user can confirm the pairing between the mobile phone 100, the phone number, and the remote control 107. As a result of the confirmation process, if used, the device identifier for the mobile device can be associated with a UAID and an association between the remote control 107, the phone 100, and the UAID will now exist for use as described herein. Preferably, the transaction provided to complete this process is done in a secure manner to protect the personal data.

Once the mobile phone 100 is paired with the remote control 107 and the UAID is associated within the remote control 107 to the device ID for the mobile phone 107, each time the mobile phone 100 comes into close proximity with the remote control 107 and is re-paired therewith, the remote control 107 can relay this information to the media access device, and the media access device can relay this information (and any other obtained information such as interactions by the user with the media access device and/or content services associated with the media access device, other registered phones also in proximity to the device with the user, etc.) to the partner advertisers and the like for value. For example, the real-time identity information (and device/content usage information as needed) could be licensed to a content ratings service, content provider, platform provider, app provider, and the like for the purpose of content recommendation, app recommendation, accessory recommendation, addressable and multi-platform advertising, etc.

In view of the foregoing it will be understand that the systems/methods described herein address the problem that the content recommendation services associated with media streaming services currently require that the viewer manually "log in" or identify themselves on each sitting. More particularly, using the described Universal-ID, the process of identifying who's watching TV is automated once it is initially setup, so there is no manual action required at each sitting by the consumer. In addition, this automated solution will work across all streaming service applications and will be more accurate than the manual process. The describe process will work every time, versus only when the user remembers to do it, therefore simplifying the process and providing a far better consumer experience.

The systems/methods described herein also address the problem that one of the most annoying tasks when unboxing and setting up a new TV is configuring each streaming content service. More particularly, with the Universal-ID and the Universal-ID remote describe herein, the currently utilized, manual process could be automated across all content services without the consumer having to do anything. It of course would require initial setup, which would occur the first time a content service (or services, if a federated or single sign-on solution is utilized) is setup with Universal-ID, but, once the user pairs their mobile device with the remote, the remote/TV work together to activate all of the content services on the TV and any future TVs.

The systems/methods described herein also address the problem that it can be a somewhat annoying task to configure the TV to work with the home Wi-Fi network. More particularly, with the Universal-ID and the Universal-ID remote describe herein, the currently utilized, manual process can also be automated. If the user agrees to opt-in to this feature, once the mobile phone is paired with the remote, the Wi-Fi configuration information can be entered and stored in a secure-store, and can be recalled during all future TV setups, or when the Wi-Fi password is changed, drastically simplifying the setup process. As will also be appreciated, one of the big advantages of this method is if the Wi-Fi password on the home router is changed, this process can be used to update all of the TVs in the house automatically, all at once without having to do it on a TV-by-TV basis, regardless of the brand of TV, as long as the TV supports Universal-ID.

The systems/methods described herein also address the problem that one of the most annoying things watching TV today is getting ads that are either inappropriate for a household or highly repeated. More specifically, the Universal-ID AdBlock feature will prevent such ads as the feature can be used to block specific addressable ads from being displayed to a user. When an addressable ad is displayed, the user can press an AdBlock button on the remote and disable the ad for a particular length of time for the particular user, e.g., 1 day, 1 week, 1 month or 1 year. This information is shared with the TV's addressable ad backend and the ad targeting service simply selects the next best ad to play based on the household or view demographic.

It will also be appreciate that the Universal-ID described herein can be setup to include payment information that would allow the light-touch method of purchasing of product or services (content, etc) on a TV, can be used to authenticate and onboard all Universal-ID enabled smart devices in the home, and the like.

Although certain example methods and apparatus have been described herein, the scope of coverage of this patent is not limited thereto. Accordingly, the descriptions are not intended to be limiting and all methods, apparatus, and articles of manufacture fairly falling within the scope of the appended claims either literally or under the doctrine of equivalents are intended to be covered.

All patents cited within this document are hereby incorporated by reference in their entirety.

I claim:

1. A system, comprising:
a mobile device; and
a receiving device associated with a media access device;
wherein the receiving device comprises a processor and a memory, the memory having instructions which, when executed by the processor, cause the receiving device to:
obtain from the mobile device during a process in which the mobile device and the receiving device are paired a first identifier that uniquely identifies the mobile device;
cause the first identifier to be associated within the receiving device to a universal advertising identifier;
determine that the mobile device is in proximity to the receiving device; and
when the mobile device is determined to be in proximity to the receiving device, causing at least the universal advertising identifier to be provided to a remote server whereby the remote server can track at least a presence of a user with the media access device.

2. The system as recited in claim 1, wherein the mobile device comprises a mobile phone.

3. The system as recited in claim 1, wherein the mobile device comprises a user wearable device.

4. The system as recited in claim 3, wherein the user wearable device comprises a smart watch.

5. The system as recited in claim 3, wherein the user wearable device comprises a fitness tracking device.

6. The system as recited in claim 1, wherein the receiving device comprises a remote control configured to transmit communications to the media access device.

7. The system as recited in claim 1, wherein the receiving device is a component part of the media access device.

8. The system as recited in claim 1, wherein the media access device comprises a smart television.

9. The system as recited in claim 1, wherein the media access device comprises a media streaming device.

10. The system as recited in claim 1, wherein the instructions cause the receiving device to use a user entered phone number when causing the first identifier to be associated within the receiving device to the universal advertising identifier.

11. The system as recited in claim 1, wherein the instructions cause the receiving device to use a user entered email address when causing the first identifier to be associated within the receiving device to the universal advertising identifier.

12. The system as recited in claim 1, wherein the instructions cause the receiving device to receive a notification from the mobile device when the mobile device determines that the mobile is in proximity to the receiving device.

13. The system as recited in claim 1, wherein the instructions cause the receiving device to determine that the mobile device is in proximity to the receiving device whenever the receiving device and the mobile device are subsequently paired.

14. The system as recited in claim 1, wherein the instructions cause the receiving device to use a strength of a signal received from the mobile device to determine that the mobile device is in proximity to the receiving device.

15. The system as recited in claim 1, wherein the instructions cause the receiving device to instruct the media access device to provide state information of the media access device to the remote server with the universal advertising identifier.

16. The system as recited in claim 1, wherein the instructions cause the receiving device to cause at least the universal advertising identifier to be provided to the remote server with a notification that that the mobile device is determined to no longer be in proximity to the receiving device whereby the remote server can track when at least a presence of the user with the media access device has ended.

* * * * *